United States Patent Office 2,899,841
Patented Aug. 18, 1959

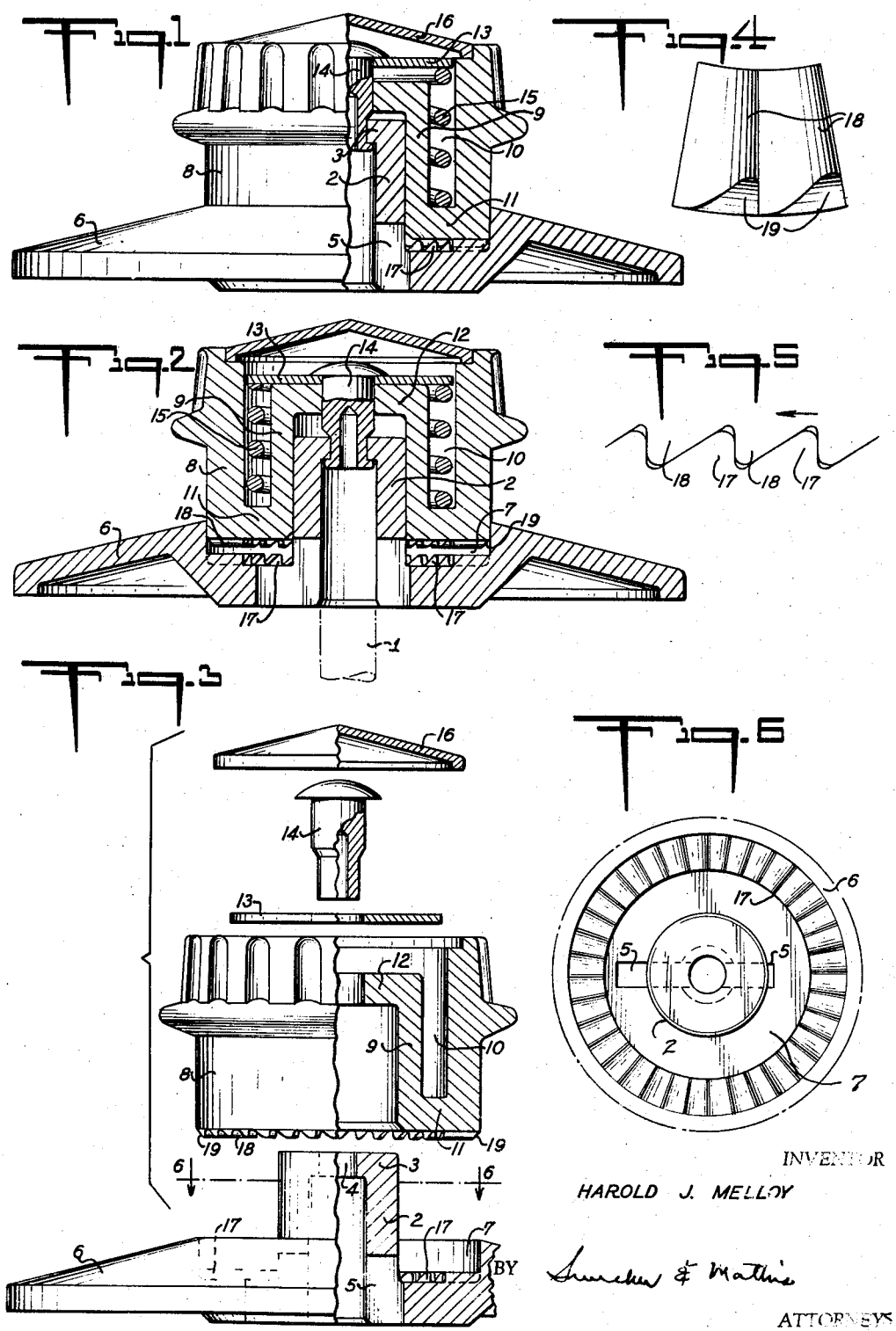

2,899,841
CONTROL KNOBS

Harold J. Melloy, Knoxville, Tenn., assignor to The Patent Button Company of Tennessee, Inc., Knoxville, Tenn., a corporation of Tennessee Application November 1, 1955, Serial No. 544,222

3 Claims. (Cl. 74—548)

This invention relates to improvements in control knobs of the character used on various household appliances, such, for example, as timers and other devices requiring the rotation of a shaft to control the appliance.

In the control of various appliances by the use of a timer, it is customary to provide a control shaft therefore, to be rotated in effecting the control. With some types of appliances or timers damage to the equipment may result, if the operator should rotate the shaft in the wrong direction, and it is therefore highly important to provide for rotation of the appliance or timer shaft in one direction only, while making it possible to provide a lost motion in the event of rotation of the control knob in the opposite direction.

It has been proposed heretofore to use a control knob for a timer shaft which is normally out of engagement and must be pushed manually into engagement to effect turning of the shaft. This is not only objectionable in practice, but it makes it possible for the operator desiring to turn the shaft in the wrong direction to force a clutch engagement, in the event of such wrong direction, by applying extra heavy pressure on the control knob.

One object of this invention is to overcome the foregoing objections to knobs proposed heretofore, while providing for freedom of turning movement of the appliance or timer shaft in one direction, without serious danger of injury to the appliance or timer, in the event of turning in the opposite direction.

Another object of the invention is to improve the construction of control knobs to provide clutch engagement between separate portions thereof, with means for yieldably holding these parts in clutch engagement normally to insure of rotation in a forward direction, and having means for relative slippage in the event of rotation in the opposite direction.

These objects may be accomplished, according to one embodiment of the invention, by the provision of a dial plate having a center post connected therewith, and with a knob journaled on the center post for freedom of turning movement with respect thereto. These parts normally are held in engagement with each other by a coiled spring, and at the interengaged surfaces of the knob and dial, clutch teeth are formed, having bevelled opposed faces and shoulders so arranged to cause a turning movement of the center post upon rotation of the knob member in one direction, while leaving the parts free or providing lost motion therebetween in the event of turning in the opposite direction.

This embodiment of the invention is illustrated in the accompanying drawings, in which:

Fig. 1 is a vertical section through a control knob embodying this invention, parts being in elevation, and with the separate parts in their normal positions;

Fig. 2 is a cross section therethrough, with the parts disengaged;

Fig. 3 is a disassembled sectional view thereof, partly in elevation;

Fig. 4 is a bottom plan view of a portion of the teeth on the knob member;

Fig. 5 is a detail side elevation showing the interengaged teeth; and

Fig. 6 is a partial plan view of the center post and dial member substantially on the line 6—6 in Fig. 3.

The control knob illustrated as an embodiment of this invention is adapted for use with a timer or other device for controlling an appliance. The construction shown provides for rotation of the shaft in one direction, while allowing freedom of turning movement in the opposite direction. The structure of the timer or appliance is not shown, but a control shaft thereof is indicated generally at 1 in Fig. 2.

The control knob comprises a center post, generally indicated at 2, which is tubular, with a partially closed end 3, having an opening 4 through said end for the purpose of receiving a fastening member, as hereinafter described. The tubular center post 2 is sleeved over the end of the shaft 1 and may be secured thereto in any suitable manner, such as by means of a cross pin received in a slot 5 in the base of the center post 2. A press fit or other suitable means may be used for attaching the center post to the shaft 1.

Surrounding the center post 2 is a dial plate, generally indicated at 6, preferably formed in one integral piece with the center post 2, and a part of the slot 5 may extend into the dial plate 6 if desired, as shown in Fig. 6. The dial plate 6 usually carries various indicia on the upper or outer face thereof, to indicate the position of the shaft 1 when rotated.

The dial plate 6 is also provided with an annular recess 7 in the upper or outer face thereof, surrounding the center post 2 and extending outwardly an appreciable distance therefrom. This recess 7 extends downward from the upper face of the dial plate an appreciable distance for the purpose of receiving therein the lower end of the knob member.

The knob member is shown at 8, the body portion of which is telescoped into the recess 7 at the lower or inner end of the knob member. A spaced inner wall 9, formed integral with the body portion of the knob member, surrounds and is journaled on the center post 2 for axial sliding movement, as well as rotation with respect thereto. An annular recess 10 is formed intermediate the body portion of the knob member 8 and the annular wall 9 extending downwardly from the upper face of said member and closed at the bottom by a bottom wall 11 which extends transversely of the recess 7 substantially throughout the width of said recess.

The annular wall 9 has a partially closed end 12 overlapping the end of the post 2. A washer 13 extends over the closed end 12 of the wall 9 and is confined by a headed fastening 14, such as a rivet, that extends through the washer 13 and through the partially closed ends 3 and 12. The end section 12 is slidably mounted on the periphery of the fastening 14 when the latter is upset, in the relation shown in Figs. 1 and 2, to permit of axial movement of the knob member, in the event of turning of said knob member in an abnormal direction.

A coiled spring 15 is interposed between the washer 13 and the bottom wall 11 of the knob member 8, normally tending to hold the knob member in its normal position shown in Fig. 1. It is possible, however, to lift the knob member against tension of the spring 15, so as to rotate the knob member in abnormal direction, if required for any reason. Such reverse direction of turning movement will cause some axial shifting of the knob member against the tension of the spring. Such rotation does not turn the shaft 1, and therefore does not affect the appliance or the timer connected with the shaft.

The outer end of the body portion of the knob member 8 is normally open. A central disk 16 may be fitted into the open outer end of the knob member 8 to enclose the assembled parts therein and to add to the ornamental appearance of the control knob.

The dial plate 6 is provided with a series of clutch teeth 17 on the upper face of the bottom of the recess 7. The bottom face of the wall 11 of the knob member is also provided with complementary teeth 18. These teeth 17 and 18 are arranged in concentric rows around the axis of the center post 2 between the opposing faces of the members in positions to interengage when the knob member is in its normal position as shown in Fig. 1. They may be forcibly disengaged by pulling up the knob member 8 against tension of the spring 15, as shown in Fig. 2.

It is preferred that the teeth 17 and 18 have bevelled outer faces so as to engage in one direction of rotation of the knob member 8 about the axis of the control knob, as indicated by the arrow in Fig. 5. However, if the knob member 8 should be turned in the oposite direction, the spring 15 would yield to allow the teeth 18 to ride free over the teeth 17, whereby the control shaft 1 would not be rotated. In the illustrated embodiment, the normal direction of turning of the shaft is clockwise, but if the knob member should be rotated in a counterclockwise direction, the shaft would not be turned in that direction and thereby any danger of damage to the appliance or timer would be avoided. The tension of the spring 15 should be light enough to allow the teeth 18 to ride freely over the teeth 17 when turned in an abnormal direction, and yet sufficient to hold the teeth 17 and 18 engaged positively, for turning movement in the normal direction.

The clutch is assembled within the knob and entirely enclosed thereby. Therefore, no positive anchorage of the clutch to the shaft is required.

While the control knob may be made of any suitable material, it is preferable that the main parts thereof be formed of plastic or other suitable moldable material. In that event, the fastening 14, washer 13 and central disk 16 may be made of metal. Suitable means may be used for applying indicia to the outer face of the dial plate 6 and coacting indicia may be provided on the appliance. The shape and character of the knob member may be varied, as desired, but it should be so formed as to provide for secure grasping thereof to turn the timer shaft effectively and in the right direction.

While the invention has been illustrated and described in one embodiment, it is recognized that variations and changes may be made therein without departing from the invention as set forth in the claims.

I claim:

1. A control knob comprising a center post adapted to be connected with an appliance control member, a dial plate connected with the inner end of the center post and extending laterally therefrom, a knob member journaled on the center post for rotary and axial movement relative thereto, said knob member comprising an outer body portion and an inner wall spaced therefrom with a closed bottom joining said body portion and inner wall together, a washer extending over the outer end of the center post and inner wall of the control knob and over the space between said inner wall and outer body portion of said knob, a fastening connecting said washer with the center post, a coiled spring surrounding the inner wall and interposed between the washer and the closed bottom normally tending to urge the control knob downward on the center post, and one-way engaging clutch means between the inner end face of the knob member and the dial plate.

2. A control knob comprising a center post adapted to be connected with an appliance control member, a dial plate connected with the inner end of the center post and extending laterally therefrom, a knob member journaled on the center post for rotary and axial movement relative thereto, said knob member comprising an outer body portion and an inner wall spaced therefrom with a closed bottom joining said body portion and inner wall together, clutch teeth on the inner end face of the knob member and dial plate having beveled outer faces and axially extending lateral faces for one-way clutch engagement, a washer extending over the outer end of the center post and over and beyond the outer end of the inner wall of the control knob, a fastening connecting said washer with the center post, and a coiled spring sleeved over the inner wall and interposed between the washer and the closed bottom normally tending to urge the control knob downward on the center post and the teeth into interengagement in one direction of turning movement of the knob member.

3. A control knob comprising a center post adapted to be connected with an appliance control member, a dial plate connected with the inner end portion of the center post and extending laterally therefrom, a knob member journaled on the center post for rotary and axial movements relative thereto, said knob member comprising an outer body portion and an inner wall spaced therefrom with a bottom section joining said body portion and inner wall together, said inner wall projecting outwardly along the post beyond the end of said post and having an end section overlapping the end of the post, a washer extending over said end section of the inner wall and over the space between said inner wall and the outer body portion, a fastening connecting said washer with the center post, spring means interposed between the washer and the bottom section of the knob member, and clutch means between the knob member and the dial plate.

References Cited in the file of this patent

UNITED STATES PATENTS

| | | |
|---|---|---|
| 711,443 | Sharp | Oct. 14, 1902 |
| 1,622,783 | Heymann | Mar. 29, 1927 |
| 2,427,310 | Shumaker | Sept. 9, 1947 |
| 2,501,008 | Schramm | Mar. 21, 1950 |
| 2,632,240 | Smith | Mar. 24, 1953 |
| 2,742,127 | Mumford et al. | Apr. 17, 1956 |
| 2,797,592 | Marrapese | July 2, 1957 |